(12) United States Patent
Lai et al.

(10) Patent No.: US 7,555,678 B2
(45) Date of Patent: Jun. 30, 2009

(54) SYSTEM FOR BOOTING FROM A NON-XIP MEMORY UTILIZING A BOOT ENGINE THAT DOES NOT HAVE ECC CAPABILITIES DURING BOOTING

(75) Inventors: Ming-Shiang Lai, Hsin-Chu (TW); Yung-Chun Lei, Hsin-Chu (TW)

(73) Assignee: MediaTek Inc., Hsin-Chu Hsien (TW)

( * ) Notice: Subject to any disclaimer, the term of this patent is extended or adjusted under 35 U.S.C. 154(b) by 359 days.

(21) Appl. No.: 11/277,349

(22) Filed: Mar. 23, 2006

(65) Prior Publication Data

US 2007/0226548 A1  Sep. 27, 2007

(51) Int. Cl.
*G06F 11/00* (2006.01)

(52) U.S. Cl. .................................. 714/36; 713/1; 713/2
(58) Field of Classification Search ................... 714/36; 713/1, 2

See application file for complete search history.

(56) References Cited

U.S. PATENT DOCUMENTS

| | | | | |
|---|---|---|---|---|
| 5,581,768 | A * | 12/1996 | Garney et al. | 718/104 |
| 6,145,069 | A * | 11/2000 | Dye | 711/170 |
| 6,327,106 | B1 * | 12/2001 | Rothberg | 360/53 |
| 6,446,203 | B1 * | 9/2002 | Aguilar et al. | 713/2 |
| 6,459,624 | B1 * | 10/2002 | Kuo | 365/185.33 |
| 6,591,376 | B1 * | 7/2003 | VanRooven et al. | 714/36 |
| 6,601,167 | B1 * | 7/2003 | Gibson et al. | 713/2 |
| 6,611,912 | B1 * | 8/2003 | Maleck et al. | 713/100 |
| 6,711,059 | B2 | 3/2004 | Sinclair et al. | |
| 6,892,323 | B2 * | 5/2005 | Lin | 714/36 |
| 7,058,779 | B1 * | 6/2006 | McClain | 711/170 |
| 7,073,053 | B1 * | 7/2006 | Oz et al. | 713/2 |
| 7,089,414 | B2 * | 8/2006 | Langford et al. | 713/2 |
| 7,098,899 | B1 * | 8/2006 | Ginosar | 345/204 |
| 7,100,087 | B2 * | 8/2006 | Yang et al. | 714/36 |
| 7,120,730 | B2 * | 10/2006 | Maleug et al. | 711/103 |
| 7,143,275 | B2 * | 11/2006 | Cepulis et al. | 713/1 |
| 7,159,091 | B1 * | 1/2007 | Hatalkar et al. | 711/165 |
| 7,234,051 | B2 * | 6/2007 | Munguia et al. | 713/2 |
| 7,243,856 | B2 * | 7/2007 | Agami et al. | 235/492 |
| 7,295,463 | B2 * | 11/2007 | Yang et al. | 365/163 |

(Continued)

FOREIGN PATENT DOCUMENTS

EP    1 607 865 A1    12/2005

(Continued)

*Primary Examiner*—Robert Beausoliel
*Assistant Examiner*—Joshua P Lottich
(74) *Attorney, Agent, or Firm*—Winston Hsu

(57) ABSTRACT

A booting system is disclosed for booting from a non-XIP memory utilizing a boot engine that does not have ECC capabilities during booting. The booting system includes: a non-XIP memory for storing a boot loader code and a plurality of operation system (OS) images, wherein the OS images in the non-XIP memory correspond to a same source image; an XIP memory for storing a shadowed boot loader code and OS images; a Central Processing Unit (CPU) for executing the OS images stored in the XIP memory; a code shadowing module for performing error detection checking on the OS images in the non-XIP memory and shadowing the boot loader code and OS images to the XIP memory; and a non-XIP interface for enabling the boot engine to access the non-XIP memory.

13 Claims, 3 Drawing Sheets

U.S. PATENT DOCUMENTS

| | | | | |
|---|---|---|---|---|
| 7,295,479 | B2 * | 11/2007 | Yoon et al. | 365/200 |
| 7,302,517 | B2 * | 11/2007 | Lim et al. | 711/103 |
| 7,308,567 | B2 * | 12/2007 | Yamamoto et al. | 713/1 |
| 7,318,173 | B1 * | 1/2008 | Falik et al. | 714/36 |
| 7,334,179 | B2 * | 2/2008 | Zhang et al. | 714/764 |
| 7,352,621 | B2 * | 4/2008 | Rothman et al. | 365/185.09 |
| 7,360,118 | B1 * | 4/2008 | Fesler | 714/36 |
| 7,409,539 | B2 * | 8/2008 | Arnez et al. | 713/100 |
| 2003/0028708 | A1 * | 2/2003 | Moran | 711/103 |
| 2003/0028760 | A1 | 2/2003 | Chang et al. | |
| 2003/0172261 | A1 | 9/2003 | Lee et al. | |
| 2003/0206442 | A1 * | 11/2003 | Tang et al. | 365/185.17 |
| 2003/0233533 | A1 | 12/2003 | Avraham | |
| 2004/0031031 | A1 * | 2/2004 | Rudelic | 717/175 |
| 2004/0068644 | A1 | 4/2004 | Hutton et al. | |
| 2004/0076069 | A1 | 4/2004 | Voth et al. | |
| 2004/0153724 | A1 * | 8/2004 | Nicholson et al. | 714/6 |
| 2004/0193864 | A1 | 9/2004 | Tsai | |
| 2004/0199825 | A1 * | 10/2004 | Zeller et al. | 714/36 |
| 2004/0230738 | A1 * | 11/2004 | Lim et al. | 711/103 |
| 2005/0038983 | A1 * | 2/2005 | Moran | 713/1 |
| 2005/0080986 | A1 * | 4/2005 | Park | 711/103 |
| 2005/0207232 | A1 * | 9/2005 | Delfs et al. | 365/185.33 |
| 2005/0268077 | A1 * | 12/2005 | Kuan et al. | 713/1 |
| 2006/0109725 | A1 * | 5/2006 | Yoon et al. | 365/200 |
| 2006/0143368 | A1 * | 6/2006 | Lasser et al. | 711/103 |
| 2006/0214005 | A1 * | 9/2006 | Agami et al. | 235/492 |
| 2007/0014136 | A1 * | 1/2007 | Ali et al. | 365/1 |
| 2007/0033348 | A1 * | 2/2007 | Oh | 711/149 |
| 2007/0043938 | A1 * | 2/2007 | May et al. | 713/2 |
| 2007/0076475 | A1 * | 4/2007 | Malueg et al. | 365/185.03 |
| 2007/0094439 | A1 * | 4/2007 | Kumar et al. | 711/103 |
| 2007/0283130 | A1 * | 12/2007 | Bolanowski et al. | 712/14 |
| 2008/0026535 | A1 * | 1/2008 | Yang et al. | 438/335 |
| 2008/0046636 | A1 * | 2/2008 | Gross et al. | 711/102 |

FOREIGN PATENT DOCUMENTS

| | | |
|---|---|---|
| KR | 10-0534613 | 12/2005 |

\* cited by examiner

SYSTEM FOR BOOTING FROM A NON-XIP MEMORY UTILIZING A BOOT ENGINE THAT DOES NOT HAVE ECC CAPABILITIES DURING BOOTING

BACKGROUND

The invention relates to booting from a non-XIP memory, and more particularly, to booting from a non-XIP memory utilizing a boot engine that does not utilize ECC capabilities when booting.

Modern communications technology utilizes both NOR flash memory and NAND flash memory. NOR flash memory is an XIP (Execution in Place) memory that supports booting, and allows code to be directly executed. The disadvantage of NOR flash memory, however, is that the density is limited. For storing images and content, particularly in high-end communication devices, NAND flash memory is the preferred option. The advantages of NAND flash memory over NOR flash memory are faster program and write speeds, and a higher density. NAND flash memory is a non-XIP memory, and therefore has to shadow codes to an XIP memory (e.g. a RAM) before booting can take place. Non-XIP memories often suffer from bit-flipping, where a bit is reversed or reported as reversed. Bit-flipping can have serious consequences for a CPU. When booting from a non-XIP memory, therefore, the system will carry out EDC and ECC checks during the code shadowing process.

Booting from a non-XIP memory can be entirely hardware based or a combination of hardware and software. The hardware method is called a boot engine method. The CPU operation is paused by the boot engine through well-known techniques such as gating a clock fed into the CPU or asserting a reset signal to the CPU, and a boot loader code, contained in the non-XIP memory, is shadowed to the XIP memory. The boot loader code is then executed by the boot engine, so Operation System (OS) images stored in the non-XIP memory can be shadowed to the XIP memory. EDC and ECC checks are carried out at the same time. Code shadowing, EDC, and ECC processes are performed by the boot engine. After all the codes have been shadowed to the XIP memory, the boot engine re-activates the CPU, which then executes the OS images in the XIP memory. In short, the related art boot engine method utilizes a boot engine, an individual hardware component different from the existing CPU, to handle all booting sequences including hardware initialization, code shadowing, EDC/ECC checking, and OS start-up.

The software method utilizes a ROM that contains the boot loader code. The ROM is mapped at the top of the CPU address space, and also contains a Reset Code. The Reset Code, executed by the CPU, initializes the hardware, and the boot loader code in the ROM is then executed by the CPU. The boot loader code is for shadowing the OS images in the non-XIP memory to the XIP memory. Similar to the functionality of the above boot engine, the boot loader code is further executed to perform EDC and ECC checks at the same time. Once all the images have been shadowed, the CPU will execute the OS images in the XIP memory. In short, the related art software method utilizes a CPU to handle all booting sequences including hardware initialization, code shadowing, EDC/ECC checking, and OS start-up.

The related art software method needs a longer period of time to complete the booting sequence, but is easier to implement. The related art hardware method requires a shorter period of time to complete the booting sequence, but has greater architectural complexity due to the complicated EDC/ECC hardware. It is desired to invent a new and improved booting system having reduced architectural complexity and requiring a shorter period of time to complete the booting sequence.

SUMMARY

It is one of the objectives of the present invention to provide a system for booting from a non-XIP memory that reduces the complexity of the system, and a related method thereof.

Briefly described, the system comprises a non-XIP memory for storing a boot loader code and operation system (OS) images, wherein the OS images stored in the non-XIP memory correspond to the same source image; an XIP memory for storing shadowed boot loader codes and OS images; and a boot engine, coupled to the non-XIP memory and the XIP memory, for shadowing the boot loader code to the XIP memory, executing the shadowed boot loader code to carry out error detection (EDC) checking on at least one OS image stored in the non-XIP memory, and shadowing a specific OS image to the XIP memory if no errors are detected when carrying out EDC checking on the specific OS image, wherein the code shadowing module does not have error correction (ECC) capabilities during booting.

A method is also disclosed for booting from a non-XIP memory storing a boot loader code and a plurality of operation system (OS) images, wherein the OS images stored in the non-XIP memory correspond to the same source image, the method comprising: providing an XIP memory; shadowing the boot loader code from the non-XIP memory to the XIP memory; executing the shadowed boot loader code for carrying out error detection (EDC) checking on at least one OS image in the non-XIP memory, and shadowing a specific OS image from the non-XIP memory to the XIP memory if no errors are detected when carrying out EDC checking on the specific OS image, wherein no error correction (ECC) can be performed during booting.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
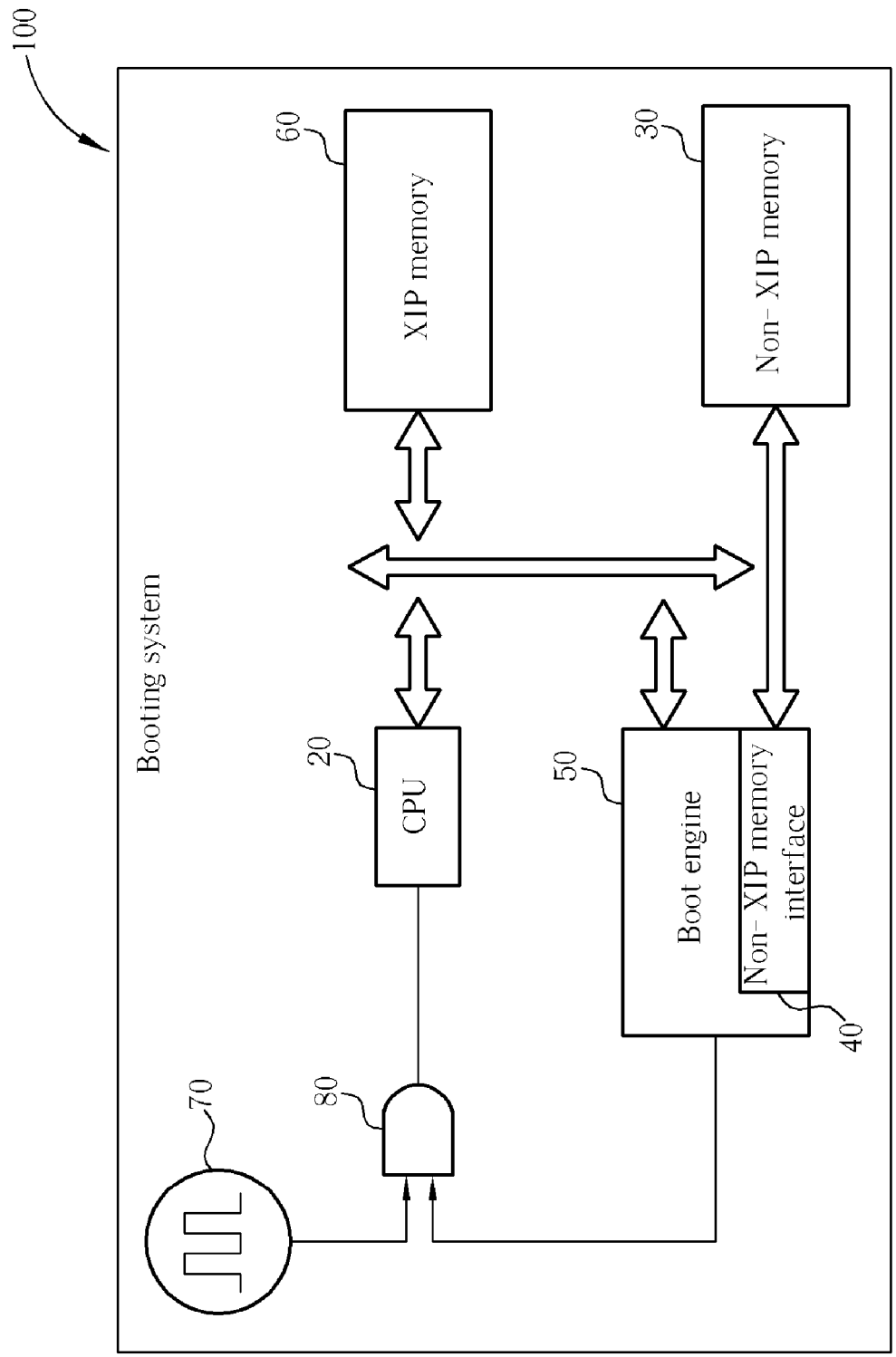
FIG. 1 is a diagram of a booting system for booting from a non-XIP memory according to a first embodiment of the present invention.

Please refer to FIG. 1. FIG. 1 is a diagram of a booting system 100 for booting from a non-XIP memory according to a first embodiment of the present invention. In this embodiment, the booting system 100 comprises a Central Processing Unit (CPU) 20; an XIP memory 60; a boot engine 50; a clock 70; a non-XIP memory 30; and a non-XIP memory interface 40. The non-XIP memory 30 in this embodiment is realized by a non-volatile memory such as a NAND-type serial Flash memory. The XIP memory 60 in this embodiment is realized by a volatile memory such as a Random Access Memory (RAM). Please note this is merely one embodiment of the system and not a limitation. The non-XIP memory 30 stores a boot loader code and a plurality of operation system (OS) images. As the non-XIP memory 30 does not support Execution in Place (XIP), the OS image and boot loader code must first be shadowed to the XIP memory 60 before they can be executed. Please note that in this embodiment, the boot engine 50 only has EDC capabilities during booting and cannot perform ECC checking, so each OS image is duplicated a plurality of times, each duplicate being stored in a different block of the non-XIP memory 30, wherein the duplicates correspond to the same source image. By storing the OS images in different areas of the non-XIP memory 30 to serve as backup images, the chances of a bit being reversed or reported reversed are greatly reduced since the probability of existence of an error-free OS image is increased. Please note the number of times each OS image is duplicated can be determined by the designer and is not a constraint of the booting system 100.

When the booting system 100 is initialized, the boot engine 50 is actuated to shadow the boot loader code to the XIP memory 60. During the booting process the CPU 20 is paused by the boot engine 50 using a well-known technique, for example, clock-gating. As shown in FIG. 1, an AND gate 80 serving as a clock-gating apparatus is implemented. Therefore, as the boot engine 50 outputs logic low "0" to the AND gate 80, the output of the AND gate 80 is forced to be logic low "0", thereby gating the clock inputted into the CPU 20. The CPU 20 is re-activated once the boot engine 50 outputs logic high "1" to the AND gate 80 for disabling the clock-gating effect. It should be noted that, as known to those skilled in this art, the clock-gating apparatus can be implemented by other logic gates. The AND gate 80 shown in FIG. 1 is only for illustrative purposes.

The boot engine 50 then executes the shadowed boot loader code in the XIP memory 60 for carrying out EDC on one selected OS image and shadowing the selected OS image to the XIP memory 60. The boot engine 50 proceeds to a first block (i.e. a default block) in the non-XIP memory 30 containing a first OS image. In this embodiment, the boot engine 50 only has EDC capabilities during booting, and cannot carry out error correction. If no error is detected, the first OS image will be shadowed to the XIP memory 60 to act as the desired error-free OS image. However, if an error is detected, as the boot engine 50 is not capable of correcting the error it will proceed to a next block in the non-XIP memory 30 that contains a first duplicate of the first OS image. If the duplicate also contains errors, the boot engine 50 will similarly proceed to a next block containing a second duplicate of the first OS image. The duplication of the OS images greatly decreases the likelihood that an OS image will contain errors. Once an OS image duplicate has been found that does not contain errors, the error free image will be shadowed to the XIP memory 60. In short, the EDC checking procedure will continue until an OS image is found to be error-free and has been shadowed to the XIP memory 60 completely. At this point the CPU 20 will be activated, and will start to execute the shadowed OS image from the XIP memory 60.

In a preferred embodiment, the boot engine 50 does not have ECC hardware to achieve the objective of simplifying the hardware complexity significantly. However, in an alternative design, the boot engine 50 can still have ECC capacity but the ECC hardware is designed to be disabled during the booting sequence. The disclosed image shadowing process can still be performed correctly, and this alternative design still falls in the scope of the present invention. Moreover, the non-XIP memory interface 40 as shown in FIG. 1 is embedded in the boot engine 50 and coupled to the non-XIP memory 30. The data transfer between the boot engine 50 and the non-XIP memory 30 is through the non-XIP memory interface 40. However, as known to those skilled in this art, the non-XIP memory interface can be implemented as a standalone component positioned between the boot engine 50 and the non-XIP memory 30.

A second embodiment takes account of the fact that if one error exists in an OS image the whole image will have to be discarded. In addition, the larger the size of the OS image, the greater the probability of detecting errors. For example, if a small end part of an OS image having a large size cannot pass EDC, the whole OS image including the previously verified error-free parts will have to be discarded. This causes the boot engine 50 to expend more time on error detection. Therefore, in the second embodiment of the system, each OS image is further divided into a plurality of parts, and each part is itself duplicated a plurality of times. The duplicated parts are all stored in separate areas of the non-XIP memory 30. The error detection process proceeds through an OS image part by part, with parts of the OS image having errors being discarded and error free parts being shadowed to the XIP memory 60. For example, if an OS image is divided into ten parts and two parts of the OS image are found to have errors, the eight error free parts will still be shadowed to the XIP memory 60. The boot engine 50 will then carry out error detection on duplicates of the two error corrupted parts. This error detection proceeds in the same way as detailed in the previous embodiment, whereby the boot engine 50 proceeds to a next block of the non-XIP memory 30 containing a duplicate of the OS image. In this case, error detection will only be carried out on the duplicates of the error corrupted parts, rather than on the whole OS image. Error free duplicates of these parts can then be shadowed to the XIP memory 60. In this way, time taken for carrying out EDC is saved.

Figure 2:
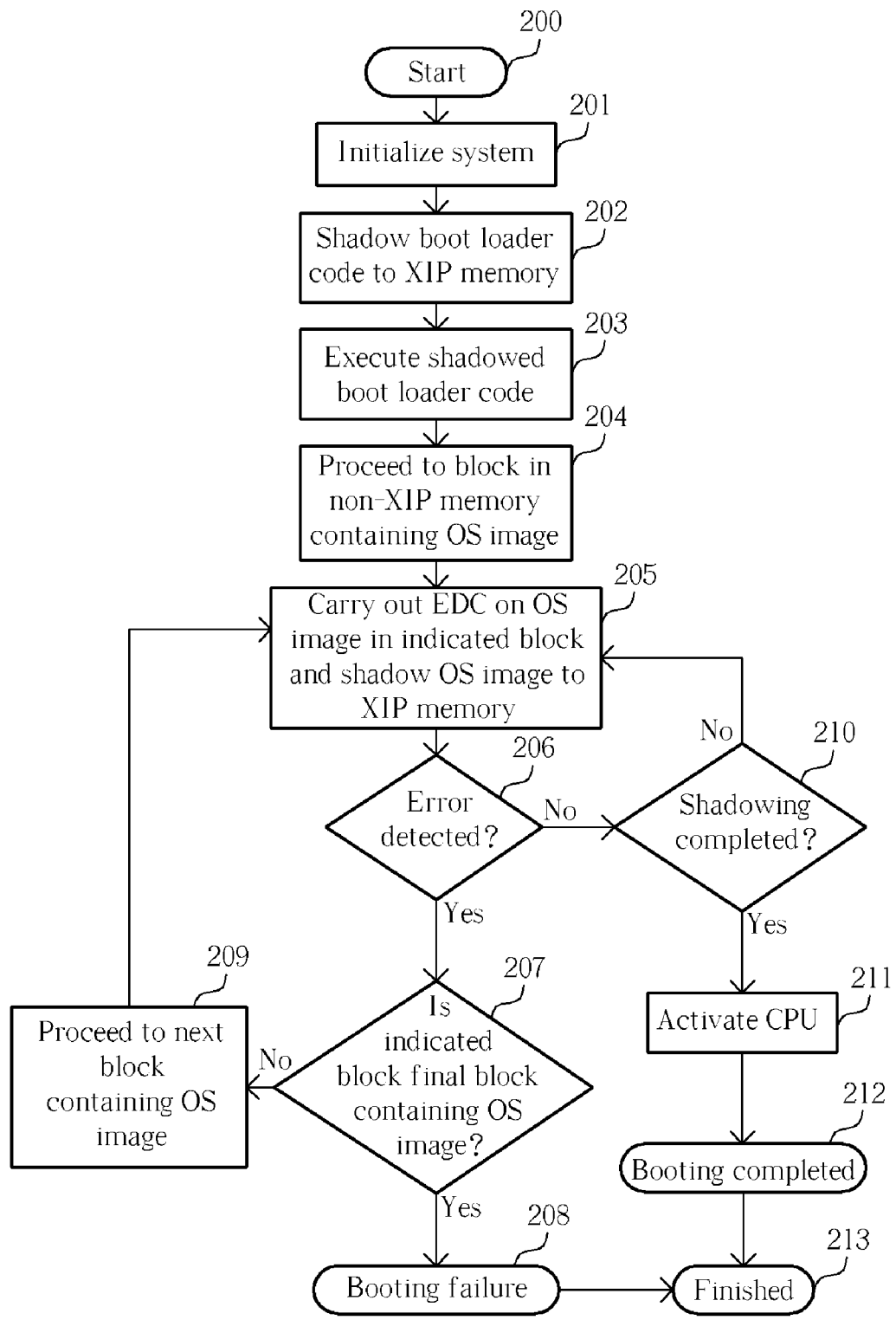
FIG. 2 is a flowchart of a method for booting from a non-XIP memory according to the first embodiment of the present invention.

Please refer to FIG. 2. FIG. 2 is a flowchart illustrating the method of booting from a non-XIP memory according to the first embodiment of the system. The steps are performed by the booting system 100 shown in FIG. 1 and summarized as follows:

Step 200: Start.
Step 201: Initialize system.
Step 202: Shadow boot loader code to XIP memory.
Step 203: Execute shadowed boot loader code.
Step 204: Proceed to block in non-XIP memory containing OS image.
Step 205: Carry out EDC on OS image in indicated block and shadow to XIP memory.
Step 206: Is an error detected? If yes go to Step 207, if no go to Step 210.
Step 207: Is the indicated block the final block containing the OS image? If yes go to Step 208, if no go to Step 209.
Step 208: Booting failure. Go to Step 213.
Step 209: Proceed to next block containing OS image, and go back to Step 205.
Step 210: Is shadowing completed? If yes go to Step 211, if no go back to Step 205.
Step 211: Activate CPU.
Step 212: Booting completed.
Step 213: Finish.

The process is started (Step 200). The booting system is initialized (Step 201) and the boot engine shadows the boot loader code to the XIP memory (Step 202). The boot engine then executes the boot loader code for carrying out EDC and shadowing an OS image to the XIP memory (Step 203). The boot engine proceeds to a block in the non-XIP memory, containing an OS image (Step 204), and then starts performing EDC on the OS image and shadowing the image to the XIP memory (Step 205). If an error is detected (Step 206), the booting system first determines if the indicated block is the final block containing the OS image, i.e. there are no more duplicates (Step 207), and if this is true the booting will fail (Step 208). If there are more duplicates of the OS image that are not accessed yet, the booting system will proceed to the next duplicate (Step 209) in a next block for starting a new shadowing and error detection process on the duplicate OS image (Step 205). If no error is detected, the booting system determines if the shadowing process is complete (Step 210). If not, the process will continue to perform EDC checking and shadowing on the OS image (Step 205). If the process is complete, i.e. one error-free OS image has been shadowed to the XIP memory, the booting system activates the CPU (Step 211). At this point the booting process is complete (Step 212). The process is finished (Step 213).

Figure 3:
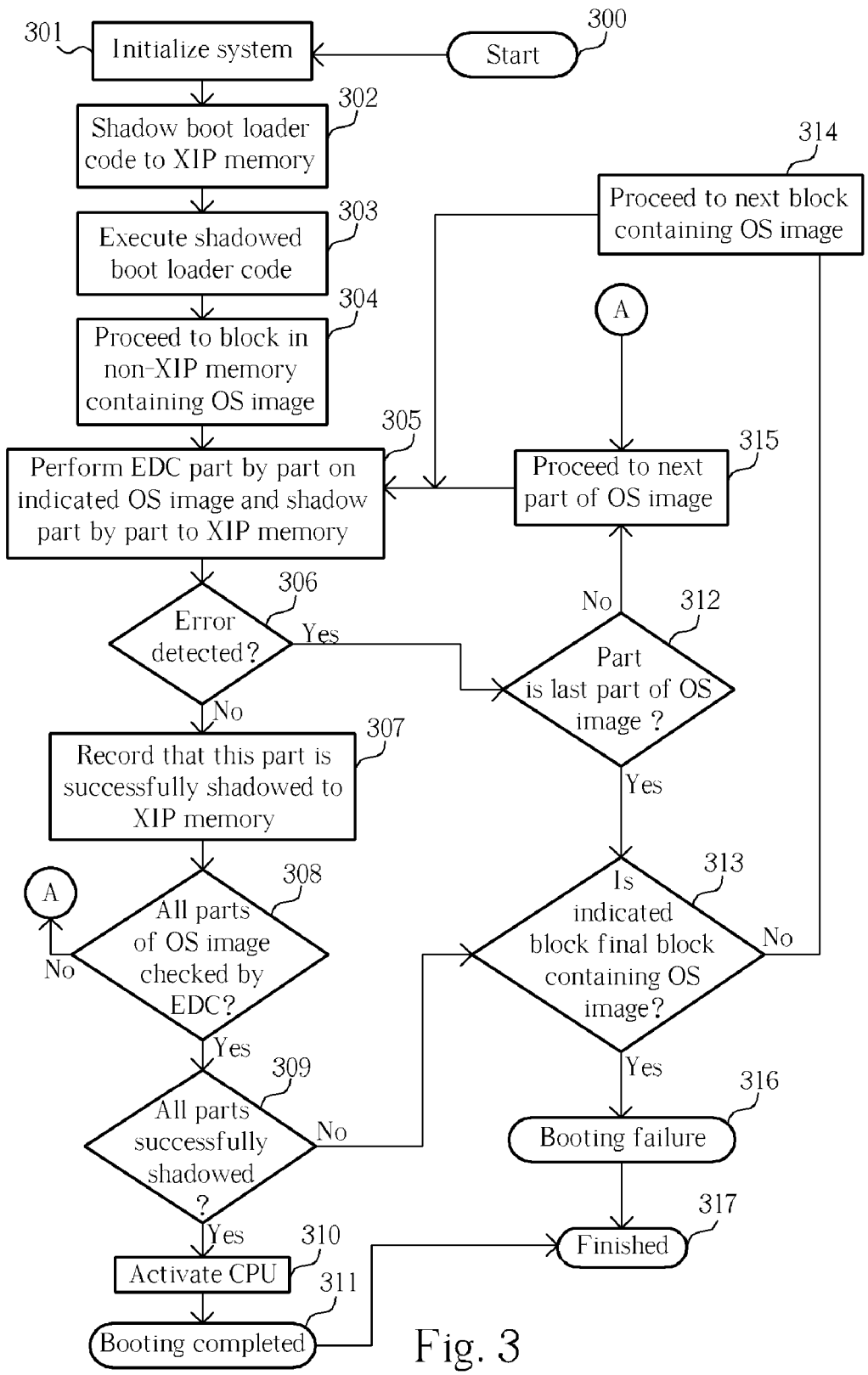
FIG. 3 is a flowchart of a method for booting from a non-XIP memory according to a second embodiment of the present invention.

Please refer to FIG. 3. FIG. 3 is a flowchart illustrating the method of booting from a non-XIP memory according to the second embodiment of the system. The steps are performed by the booting system 100 shown in FIG. 1 and summarized as follows:

Step 300: Start.
Step 301: Initialize system.
Step 302: Shadow boot loader code to XIP memory.
Step 303: Execute shadowed boot loader code.
Step 304: Proceed to block in non-XIP memory containing OS image.
Step 305: Perform EDC part by part on indicated OS image and shadow part by part to XIP memory.
Step 306: Is an error detected? If yes go to Step 312, if no go to Step 307.
Step 307: Record that this part is successfully shadowed to the XIP memory.
Step 308: Are all parts of the OS image checked by EDC? If yes go to Step 309, if no go to Step 315.
Step 309: Are all parts of the OS image successfully shadowed? If yes go to Step 310, if no go to Step 313
Step 310: Activate CPU.
Step 311: Booting is completed. Go to Step 317.
Step 312: Is the indicated part the last part of the OS image? If yes go to Step 313, if no go to Step 315.
Step 313: Is the indicated block the final block containing the OS image? If yes go to Step 316, if no go to Step 314.
Step 314: Proceed to next block containing the OS image. Go to Step 305.
Step 315: Proceed to next part of OS image. Go to Step 305.
Step 316: Booting failure.
Step 317: Finish.

The process is started (Step 300) and the booting system is initialized (Step 301). The boot engine shadows the boot loader code to the XIP memory (Step 302). The boot engine then executes the shadowed boot loader code (Step 303) and proceeds to a block in the non-XIP memory containing an OS image (Step 304). The boot engine then starts performing EDC part by part on the OS image and shadowing the OS image part by part to the XIP memory (Step 305). If an error is detected (Step 306), the booting system will determine if the indicated part is the last part of the currently indicated OS image (Step 312). If this is true, the booting system will then determine if the indicated OS image is the last image, i.e. there are no more duplicates to be accessed (Step 313). If there are no more duplicates of the OS image the booting will fail (Step 316). If the indicated part is not the last part of the OS image, the booting system will proceed to the next part of the OS image (Step 315) for shadowing and carrying out EDC on the indicated part (Step 305). If the indicated part is the last part of the OS image but there are more duplicates of the OS image to be accessed, the booting system will proceed to the next duplicate of the OS image (Step 314). If no error is detected in Step 306, the booting system will determine that the OS image part is successfully shadowed to the XIP memory (Step 307). The booting system then determines if all parts of the indicated OS image have been checked by EDC (Step 308). If this is not true, the booting system will proceed to Step 315. If all parts of the indicated OS image have been checked by EDC, the booting system will then determine if all parts have been successfully shadowed (Step 309). If this is not true, the process will go to Step 313. If all parts have been successfully shadowed to the XIP memory, the booting system will activate the CPU (Step 310). At this point the booting is completed (Step 311). The process is finished (Step 317).

It is an advantage of the present system that the boot engine is made less complex by only utilizing EDC capabilities and not requiring ECC capabilities during booting. It is a further advantage of the system that having a plurality of duplicates of each OS image reduces the possibility of errors occurring. Moreover, the second embodiment of the system, wherein each OS image is divided into a plurality of parts, simplifies the error detection procedure by only performing error detection on a part of the OS image, and avoids the possibility of a whole OS image being discarded due to error.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A booting system, comprising:
 a non-XIP memory, for storing a plurality of operation system (OS) images, wherein the OS images comprise a source image and a plurality of duplicates of the source image, and a boot loader code;
 an XIP memory, coupled to the non-XIP memory; and
 a code shadowing module, coupled to the non-XIP memory and the XIP memory, for shadowing the boot loader code to the XIP memory, executing the shadowed boot loader code to carry out error detection (EDC) checking on at least one OS image stored in the non-XIP memory, and shadowing a specific OS image to the XIP memory if no errors are detected when carrying out EDC checking on the specific OS image, wherein the code shadowing module does not have error correction (ECC) capabilities during booting;
 wherein if at least a specific part of an OS image does not pass EDC checking, the code shadowing module shadows error-free parts of the OS image to the XIP memory, carries out EDC checking on at least a duplicate of the specific part, and then shadows an error-free part corresponding to the specific part to the XIP memory.

2. The booting system of claim 1, wherein if the entire OS image does not pass EDC checking, the code shadowing module then carries out EDC checking on a duplicate of the OS image.

3. The booting system of claim 1, wherein the code shadowing module carries out EDC checking part by part.

4. The booting system of claim 1, further comprising a central processing unit (CPU), coupled to the XIP memory, for executing the shadowed OS image, wherein the code shadowing module is a boot loader engine.

5. The booting system of claim 1, wherein the code shadowing module is a central processing unit (CPU).

6. The booting system of claim 1, wherein the non-XIP memory is a NAND flash.

7. The booting system of claim 6, wherein the NAND flash is a serial flash.

8. The booting system of claim 1, wherein the code shadowing module has no ECC capability.

9. A method for booting from a non-XIP memory, the non-XIP memory storing a boot loader code and a plurality of operation system (OS) images, wherein the OS images comprise a source image and a plurality of duplicates of the source image, the method comprising:

provide an XIP memory;

shadowing the boot loader code from the non-XIP memory to the XIP memory;

executing the shadowed boot loader code for carrying out error detection (EDC) checking on at least one OS image in the non-XIP memory, and shadowing a specific OS image from the non-XIP memory to the XIP memory if no errors are detected when carrying out EDC checking on the specific OS image, wherein no error correction (ECC) is utilized during booting; and if at least a specific part of an OS image does not pass EDC checking, shadowing error-free parts of the OS image to the XIP memory, carrying out EDC checking on at least a duplicate of the specific part, and shadowing an error-free part corresponding to the specific part to the XIP memory.

10. The method of claim 9, further comprising:

if the entire OS image does not pass EDC checking, carrying out EDC checking on a duplicate of the OS image.

11. The method of claim 9, wherein the code shadowing module carries out EDC checking part by part.

12. The method of claim 9, wherein the non-XIP memory is a NAND flash.

13. The method of claim 12, wherein the NAND flash is a serial flash.

* * * * *